Patented Mar. 26, 1940

2,195,272

UNITED STATES PATENT OFFICE 2,195,272

MINERAL WOOL BINDER

Russell W. Ehlers, Flint, Mich., assignor to General Motors Corporation, Detroit, Mich., a corporation of Delaware No Drawing. Application June 14, 1937, Serial No. 148,115

7 Claims. (Cl. 210—204)

This invention relates to oil filtering materials and the principal object of the invention is to make a new material which is capable of effectively filtering the lubricating oil used on internal combustion engines and at the same time be insoluble in water.

The essential part of the invention consists in mixing casein with a nodulated mineral wool, the casein being insoluble in water and being unaffected by any water which may reach the filter either in the course of testing or after the filter is in use.

It is known to use a nodulated mineral wool mixed with a cold water paste as a binder, this combination being shown in the patent to Albra H. Fessler, 2,128,290, but it has been found that in some instances where water enters the filter the cold water paste will dissolve and the filter disintegrate.

It is therefore the object of the present invention to make a binder which will cause the filtering substance to retain its shape and at the same time be unaffected by water.

In preparing the filtering material one typical mixture consists of the following substances in about the proportions stated.

|  | Per cent by weight |
|---|---|
| Mineral wool | 43.4 |
| Water | 52.6 |
| Ammonium hydroxide | 1.03 |
| Formaldehyde | 1.25 |
| Casein | 1.72 |

The purpose of the ammonium hydroxide is to dissolve the casein and the quantity or proportion used to facilitate rapid solution will depend on the size of the casein grain. While the proportion given in the tabulation is satisfactory where a 40-mesh casein is used, a finer mesh or smaller grain casein will require but 0.40% by weight. The amount or proportion of ammonium hydroxide used, therefore, will depend on the grain size of the casein.

Other solvents than $NH_4OH$ may be used to dissolve the casein. For example, a mixture of 20% commercial borax as a minimum and 80% casein has given satisfactory results, and as no chemical reaction occurs between borax and formaldehyde (as does occur between $NH_4OH$ and formaldehyde) the availability of the formaldehyde to the casein is made possible at lower temperatures.

A water soluble casein may be used, this casein being rendered insoluble by the reactions occurring with the other ingredients so that the final casein product would be insoluble.

The formaldehyde mentioned in the foregoing tabulation may be replaced by a number of other substances which increase the resistance of the casein to water solution. For example, there may be used salts of chromium, tannic acid, aldehydes other than formaldehyde, etc.

While the amount of casein given in the example (1.72% by weight) is correct in the relative proportions of the constituents as given, nevertheless the quantity has been varied from 0.85% to 3.5% by weight with satisfactory results. The lowest limit is determined by the amount which will give satisfactory hardness to the self-sustaining filter unit, while the highest limit is determined by the amount of casein which will not adversely affect the filtering properties of the unit. With variations in the casein content there is necessitated a variation in the amount of ammonium hydroxide and hardening agent.

In preparing the mixture the casein is first dissolved in hot water to which ammonia has been added. This solution or mixture then has added thereto the formaldehyde or other hardening agent before mixing with the nodulated mineral wool. This mixture is then thoroughly mixed, preferably in a rotating bowl, the mixing period being about four minutes and depending on the nodulation of the mineral wool. After mixing, the material is suitably formed to the desired shape used for oil filters.

The formed units are then placed on perforated metal trays about one-half inch apart. Contact between the units should be avoided to prevent the occurrence of soft spots which are formed where the elements touch during drying. The units are then completely dried in a steam drier for about six hours at a temperature of from 300° to 325° F. The time required for drying will depend upon the air circulation, the humidity, etc. Satisfactory drying of the filter units has also been obtained by subjecting the units to an initial temperature of 500° F. and reducing the temperature for the latter part of the drying period to 375° F. The final internal temperature of the bonded material or filtering unit should be somewhere between 260° F. and 275° F. When the substance leaves the drier it is in the form of a hard and porous mass.

It has been found that oil filter cartridges made with nodulated mineral wool bonded with casein in accordance with the procedure mentioned will not disintegrate when immersed for several hours in hot water, hot oil, or gasoline.

If the filters are properly dried no objectionable odor of charred or undried casein is apparent and no deterioration of the bond occurs during prolonged exposure to usual atmospheric variations.

I claim:

1. In a filtering material, a nodulated mineral wool mixed with a casein binder.

2. In a filtering material, a nodulated mineral wool mixed with a mixture of casein, water, ammonium hydroxide and formaldehyde.

3. The method of making a hard porous oil filtering mass consisting of mixing a nodulated mineral wool with casein, water, ammonium hydroxide, and formaldehyde and then drying the mass to drive off the moisture.

4. The method of making a hard porous oil filtering mass consisting of a mixture comprising substantially 43.4% by weight of nodulated mineral wool, 52.6% water, 1.03% ammonium hydroxide, 1.25% formaldehyde, and 1.72% casein, thoroughly mixing the constituents, forming the same, and then drying the mass to drive off the moisture.

5. The method of making a hard porous oil filtering mass consisting of a mixture comprising substantially 43.4% by weight of nodulated mineral wool, 52.6% water, 1.03% ammonium hydroxide, 1.25% formaldehyde, and 1.72% casein, thoroughly mixing the constituents, then shaping the mixture to a desired form, then in baking the forms in an oven to drive off the moisture.

6. In a filtering material, a nodulated mineral wool mixed with a mixture of casein, a solvent for the casein, and a hardening substance for the casein.

7. The method of making a hard porous oil filtering mass consisting of mixing a nodulated mineral wool with casein, water, a solvent for casein, and a hardener for the casein, then in shaping the mass to definite forms, and then in drying the forms.

RUSSELL W. EHLERS.